ated May 28, 1968

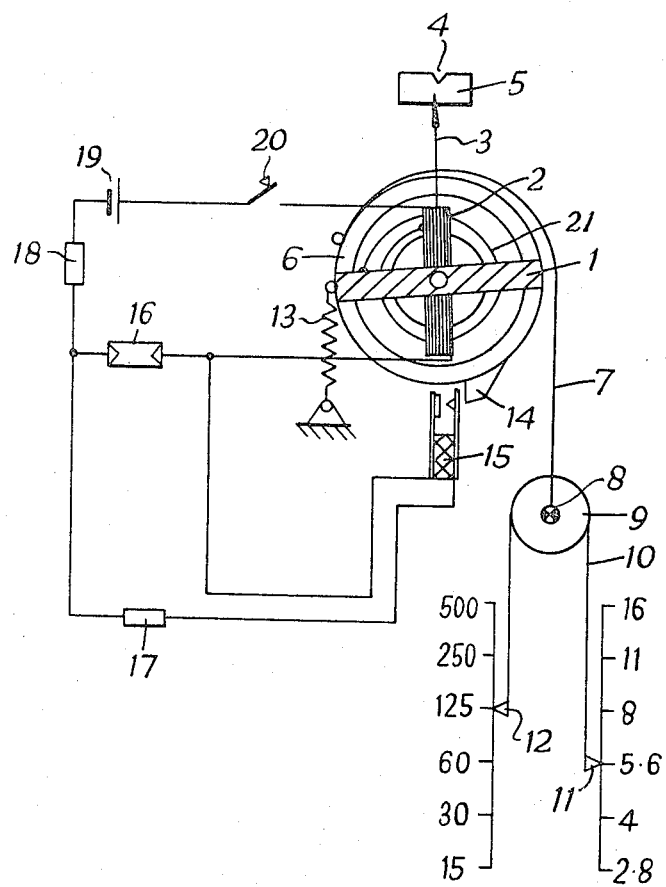

United States Patent Office 3,385,185
Patented May 28, 1968

3,385,185
PHOTOGRAPHIC CAMERA WITH EXPOSURE CONTROL MEANS
Heinz Schulze, Dresden, Germany, assignor to Veb Pentacon Dresden Kamera- und Kinowerke, Dresden, Germany
Filed Jan. 21, 1965, Ser. No. 426,982
3 Claims. (Cl. 95—10)

ABSTRACT OF THE DISCLOSURE

A camera comprises a galvanometer rotatably mounted in the camera housing. The moving coil of the galvanometer is provided with a pointer which is visible through a window in the housing and is adjustable in relation to a fixed mark also visible in the window. The galvanometer is movable bodily, against a spring attached to the outside of the magnet yoke, by diaphragm aperture and/or exposure time setting members. Also attached to the yoke is a cam which closes a switch in the galvanometer circuit so that the moving coil is fully deflected beyond the window under poor light conditions.

Background of invention

The invention relates to a photographic camera having a built-in exposure meter, the galvanometer of which is rotatably mounted, within the camera housing and is coupled with setting members for exposure factors such as diaphragm aperture, exposure time and film sensitivity.

In cameras of this kind it is possible to bring the meter pointer into the indicating position defined by an observation window or a fixed mark, even when as a result of inadequate light conditions the moving coil carrying the meter pointer shows no deflection, that is to say remains in the zero position of the galvanometer. Because the appearance of the meter pointer in the indicating position indicates to the photographer that a properly lighted exposure can be expected with the setting which has been effected, warning devices have already been provided which, when the meter pointer remaining in the zero position enters the indicating position, cover over the observation window in the housing through which the pointer is viewed or open-circuit the exposure meter. For covering the observation window, diaphragms are connected with the galvanometer, for which diaphragms either adequate pivoting space to the extent of the entire angle of deflection of the moving coil of the galvanometer, or special gear provisions for coupling this diaphragm at the moment of entry of the zero position of the galvanometer into the measurement position, are necessary, which causes constructional difficulties especially when the meter pointer is arranged in the viewfinder ray path. The further known measure, involving switching off the measurement current, has the result that the slight measurement current, which in any case is not sufficient for a recognizable deflection, is taken from the moving coil which carries the meter pointer; the moving coil moves hardly perceptibly into the zero position. The entry of the meter pointer, remaining in the zero position, into the measurement position is thus not effectively indicated to the photographer.

The purpose of the invention is the avoidance of the above disadvantages by the provision of a simple and reliably functioning warning device for the indication of the entry into the measurement region of the meter pointer remaining in the zero position of the measuring mechanism.

Summary of invention

According to the invention there is provided a photographic camera having a housing and a photo-electric exposure meter mounted therein which includes a current source, a photo-electric cell, a galvanometer having a rotatably mounted magnet yoke, adjustable by at least one exposure factor setting member of the camera, and a moving coil, the provision of (a) A pointer attached to said moving coil and movable in an indicating region,
(b) A fixed mark provided on the housing in said indicating region in relation to which mark said pointer moves and is adjustable,
(c) A switch provided in the circuit of the exposure meter to connect the moving coil to said current source to cause the pointer to deflect beyond the indicating region, and
(d) A cam attached to said magnet yoke which effects closure of said switch in the event that the pointer is about to enter the indicating region during adjustment of the exposure factor setting member.

Description of preferred embodiment

A constructional form of the invention will now be described by way of example with reference to the accompanying diagrammatic drawing.

In a camera housing (not particularly illustrated) there is rotatably mounted a galvanometer 1, the moving coil 2 of which carries a meter pointer 3, which swings opposite a fixed mark 4 visible in an observation window 5. A return spring 21 is connected between the magnet yoke 6 and moving coil 2. On the magnet yoke 6 of the galvanometer 1 there is secured the end of a cord 7, which is anchored at its other end on the spindle 8 of a pulley 9. Around the pulley 9 there is placed a further cord 10, on the two ends of which there are secured a diaphragm-setting member 11 and a time setting member 12. A tension spring 13 is attached to the magnet yoke 6. Moreover on the magnet yoke 6 there is provided a switch cam 14, in the path of which there is arranged a switch 15. The switch 15 together with a protective resistor 17 is in parallel with the photo-conductive cell 16, which is connectible in known manner, together with a series resistor 18, to the moving coil 2, by means of a measuring switch 20 through a current source 19.

The manner of operation of the new warning device is as follows:

By movement of the diaphragm-setting member 11 and/or of the time-setting member 12 the galvanometer 1 is rotated, through the cable 7, in the clockwise direction against the tension spring 13, until the meter pointer 3 stands opposite the fixed mark 4, that is to say has reached its indicating position. Thus a diaphragm-time ratio corresponding to the prevailing object brightness is set.

If the object brightness is too slight, so that the pointer 3 on the moving coil 2 shows no deflection but remains in the zero or non-displaced position i.e. its rest position when no current flows through the coil, then on adjustment of the exposure factor setting member (11 or 12) and shortly before the meter pointer 3 enters the window 5 the switch cam 14 closes the switch 15, so that current is supplied to the moving coil 2 through the resistors 17 and 18, resulting in a deflection of the moving coil 2 in the clockwise direction to beyond the window 5. Thus a combined setting of diaphragm aperture and exposure time by effecting coincidence between the meter pointer 3 and the fixed mark 4 is not possible under poor light conditions.

I claim:
1. In a photographic camera having a housing and a photo-electric exposure meter mounted therein which includes a current source, a photo-electric cell, a galvanometer having a rotatably mounted magnet yoke, adjustable by at least one exposure factor setting member of the camera, and a moving coil, of the provision of
  (a) a pointer attached to said moving coil and movable in an indicating region,
  (b) a fixed mark provided on the housing in said indicating region in relation to which mark said pointer moves and is adjustable,
  (c) a switch provided in the circuit of the exposure meter to connect the moving coil to said current source to cause the pointer to deflect beyond the indicating region, and
  (d) a cam attached to said magnet yoke which effects closure of said switch in the event that the point is about to enter the indicating region during adjustment of the exposure factor setting member.

2. A photographic camera according to claim 1, wherein the switch is connected in parallel with the photoelectric cell.

3. A photographic camera according to claim 1, wherein a positive resistor is arranged in series with the switch.

References Cited

UNITED STATES PATENTS

| | | | |
|---|---|---|---|
| 2,418,370 | 4/1947 | Simmon | 95—10 |
| 2,922,347 | 1/1960 | Hanh et al. | 95—10 |
| 3,037,436 | 6/1962 | Broschke | 95—10 |
| 3,057,276 | 10/1962 | Flach et al. | 95—10 |

FOREIGN PATENTS 1,235,184  5/1960  France.

OTHER REFERENCES

Falkenburg, German application 1,092,298, printed Nov. 3, 1960 (Kl 57a 32/05).

NORTON ANSHER, *Primary Examiner.*

JOSEPH F. PETERS, JR., *Assistant Examiner.*